United States Patent
Bhatia

(10) Patent No.: US 9,015,801 B1
(45) Date of Patent: Apr. 21, 2015

(54) METHODS AND SYSTEMS FOR HANDLING RECOVERY MESSAGES

(71) Applicant: Google Inc., Mountain View, CA (US)

(72) Inventor: Ashish Bhatia, Mountain View, CA (US)

(73) Assignee: Google Inc., Mountain View, CA (US)

(*) Notice: Subject to any disclaimer, the term of this patent is extended or adjusted under 35 U.S.C. 154(b) by 46 days.

(21) Appl. No.: 13/893,639

(22) Filed: May 14, 2013

(51) Int. Cl.
*H04L 9/32* (2006.01)
*G06F 21/31* (2013.01)

(52) U.S. Cl.
CPC .................................. *G06F 21/31* (2013.01)

(58) Field of Classification Search
CPC ......... H04L 63/12; H04L 63/14; H04L 63/10; H04L 63/107; H04L 63/123; H04L 63/126; H04L 63/0869; H04L 63/0876; H04L 63/1408; H04L 63/1416; H04L 63/1425; H04L 63/145; H04L 63/1466
USPC ........... 726/1–7, 22–24, 26–30; 713/168–170
See application file for complete search history.

(56) References Cited

U.S. PATENT DOCUMENTS

| | | | |
|---|---|---|---|
| 8,250,632 B1* | 8/2012 | Staddon | 726/4 |
| 8,745,705 B2* | 6/2014 | Hitchcock et al. | 726/5 |
| 8,776,194 B2* | 7/2014 | Hitchcock et al. | 726/6 |
| 2008/0283593 A1 | 11/2008 | He et al. | |
| 2010/0306821 A1 | 12/2010 | Cathcart et al. | |
| 2012/0166553 A1* | 6/2012 | Rubinstein et al. | 709/206 |
| 2012/0278887 A1 | 11/2012 | Vitaldevara et al. | |
| 2013/0198824 A1* | 8/2013 | Hitchcock et al. | 726/6 |

* cited by examiner

*Primary Examiner* — Hosuk Song
(74) *Attorney, Agent, or Firm* — Fox Rothschild LLP

(57) ABSTRACT

A method may include receiving, by a computing device, a recovery message directed to a first account associated with a messaging service provider. The recovery message may include access information associated with a second account of an online service provider. In an embodiment, the method may include, in response to receiving a recovery message, determining whether one or more suspicious events involving the first account have occurred, in response to determining that one or more suspicious events have occurred, prompting a user to provide authentication information in order to access the recovery message, receiving one or more responses from a user, verifying the one or more responses, and in response to determining that each of the responses is correct, granting access, by the computing device, to the recovery message.

24 Claims, 3 Drawing Sheets

METHODS AND SYSTEMS FOR HANDLING RECOVERY MESSAGES

BACKGROUND

Users of online services can register for online accounts, such as email accounts, social networking accounts, online banking accounts, health services accounts and/or the like. The most popular way to register for an account is to provide a username and password. These accounts often provide some type of recovery mechanism in case a user forgets his or her login information. For example, an account may send a recovery email that includes access information to a user's trusted email account if the user forgets his or her login information.

However, this recovery feature is often exploited by hijackers who are able to gain control of the user's email recovery account. A hijacker who gains control of a user's email recovery account can use the recovery feature of an online service to gain control of this account as well.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method may include receiving, by a computing device, a recovery message directed to a first account associated with a messaging service provider. The recovery message may include access information associated with a second account of an online service provider. In an embodiment, the method may include, in response to receiving a recovery message, determining whether one or more suspicious events involving the first account have occurred, in response to determining that one or more suspicious events have occurred, prompting a user to provide authentication information in order to access the recovery message, receiving one or more responses from a user, verifying the one or more responses, and in response to determining that each of the responses is correct, granting access, by the computing device, to the recovery message.

In an embodiment, a method may include receiving, by a computing device, a recovery message directed to a first account associated with a messaging service provider. The recovery message may include access information associated with a second account of an online service provider. In an embodiment, the method may include in response to receiving a recovery message, determining whether one or more suspicious events involving the first account have occurred, in response to determining that one or more suspicious events have occurred, prompting a user to provide authentication information in order to access the recovery message, receiving one or more responses from a user, verifying the one or more responses, and in response to determining that one or more of the responses is incorrect, performing one or more remedial actions.

In an embodiment, a system may include a computing device and a computer-readable storage medium in communication with the computing device. The computer-readable storage medium may include one or more programming instructions that, when executed, cause the computing device to receive a recovery message directed to a first account associated with a messaging service provider. The recovery message may include access information associated with a first account of an online service provider. The computer-readable storage medium may include one or more programming instructions that, when executed, cause the computing device to, in response to receiving a recovery message, determine whether one or more suspicious events involving the first account have occurred, in response to determining that one or more suspicious events have occurred, prompt a user to provide authentication information in order to access the recovery message, receive one or more responses from a user, verify the one or more responses, and in response to determining that each of the responses is correct, granting access to the recovery message.

In an embodiment, a system may include a computing device and a computer-readable storage medium in communication with the computing device. The computer-readable storage medium may include one or more programming instructions that, when executed, cause the computing device to receive a recovery message directed to a first account associated with a messaging service provider. The recovery message may include access information associated with an account of an online service provider. The computer-readable storage medium may include one or more programming instructions that, when executed, cause the computing device to in response to receiving a recovery message, determine whether one or more suspicious events involving the first account have occurred, in response to determining that one or more suspicious events have occurred, prompt a user to provide authentication information in order to access the recovery message, receive one or more responses from a user, verify the one or more responses, and in response to determining that one or more of the responses is incorrect, perform one or more remedial actions.

DETAILED DESCRIPTION

The following terms shall have, for purposes of this application, the respective meanings set forth below:

"Access information" refers to information required to access an online service account. Example access information may include, without limitation, a username, a password, an answer to a security question, a unique code, biometric data and/or the like.

"Authentication information" refers to information required to access a messaging service account such as, for example, an email account. Example authentication information may include, without limitation, a username, a password, an answer to a security question, a unique code, biometric data and/or the like.

A "computing device" refers to a device that includes a processor and tangible, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like.

A "messaging service provider" refers to a provider, manager or administrator of one or more messaging service accounts. Example message service providers may include, without limitation, email providers, text message providers, or other messaging providers.

An "online service account" refers to an account associated with a user that is accessible over a network, such as the Internet. Example online service accounts include, without limitation, an email account, a social networking account, a financial account such as an online banking account or an online commodities account, a healthcare account and/or the like.

An "online service provider" refers to a provider, manager or administrator of one or more online service accounts.

A "recovery message" refers to an electronic message that includes at least a portion of access information for an online service account. In an embodiment, a recovery message may be an email message, a text message and/or the like.

Figure 1:
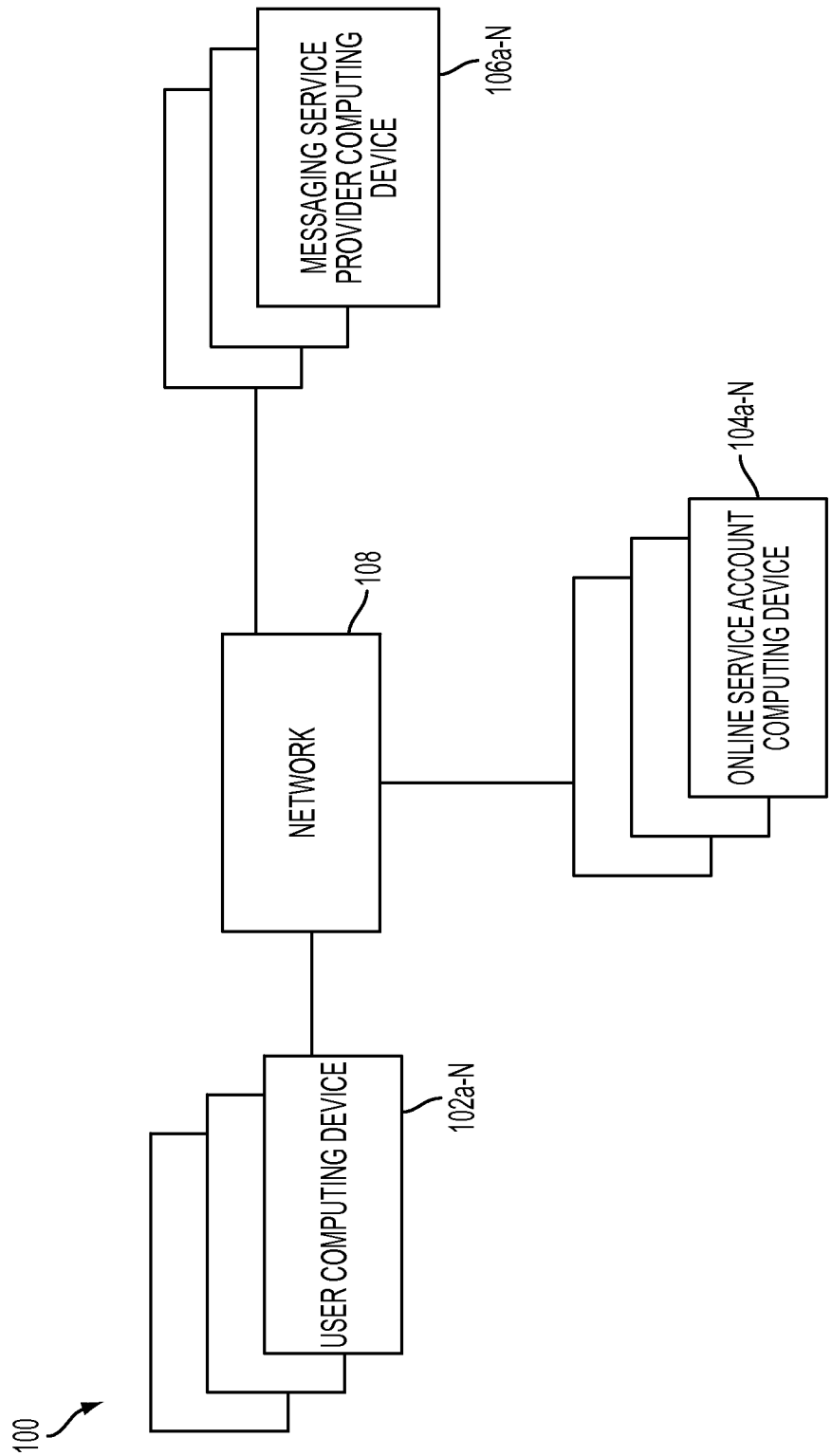
FIG. 1 illustrates an example system of accessing a recovery message according to an embodiment.

FIG. 1 illustrates an example system of accessing a recovery message according to an embodiment. As illustrated by FIG. 1, the system 100 may include one or more user computing devices 102a-N, one or more online service account computing devices 104a-N and one or more messaging service provider computing devices 106a-N.

In an embodiment, a user computing device 102a-N may be a computing device associated with a user, such as, for example, an online service account user, an email account user and/or the like. Examples of user computing devices 102a-N may include, without limitation, a laptop computer, a desktop computer, a tablet, a mobile computing device and/or the like.

In an embodiment, an online service account computing device 104a-N may be a computing device associated with an online service account provider. For example, an online service account computing device 104a-N may be a web server. In an embodiment, an online service account computing device 104a-N may be in communication with one or more user computing devices 102a-N via a communication network 108.

In an embodiment, the communication network 108 may be a local area network (LAN), a wide area network (WAN), a mobile or cellular communication network, an extranet, an intranet, the Internet and/or the like. In an embodiment, the communication network 108 may provide communication capability between a user computing device 102a-N and an online service account computing device.

In an embodiment, an online service account computing device 104a-N may be in communication with one or more messaging service provider computing devices 106a-N via a communication network 108. Although FIG. 1 illustrates an online service account computing device 104a-N in communication with a user computing device 102a-N and a messaging service provider computing device 106a-N via the same communication network, it is understood that additional and/or alternate communication networks may be used within the scope of this disclosure.

In an embodiment, a messaging service provider computing device 106a-N may be a computing device associated with a messaging service provider, such as, for example, an email provider. For example, in an embodiment, a messaging service provider computing device 106a-N may be a web server. In an embodiment, a messaging service provider computing device 106a-N may be in communication with a user computing device 102a-N via a communication network 108.

In an embodiment, a user may register for an online service account. As part of the registration process, the user may create a username, a password or other access information associated with the account. The user may also provide contact information to which a recovery message may be sent by the online service provider by request. For example, a user may request that the online service account send an email to the user's email address if the user forgets all or a portion of the user's access information needed to access the user's online service account.

In an embodiment, an online service account computing device may store one or more contact methods associated with a user. When it receives a request to send a recovery message to the user, the online service account computing device may retrieve the user's contact information and may send a recovery message to the user via using at least a portion of the contact information. For example, a user who wants to access his online service account may have forgotten his account password. The user may select an option, such as, for example, a "Forgot Password" hyperlink. The user may be prompted to provide identifying information associated with the user. For example, the user may be prompted to provide a username. The online service computing device may automatically send a recovery email to the email address associated with the account that corresponds to the provided username.

Figure 2:
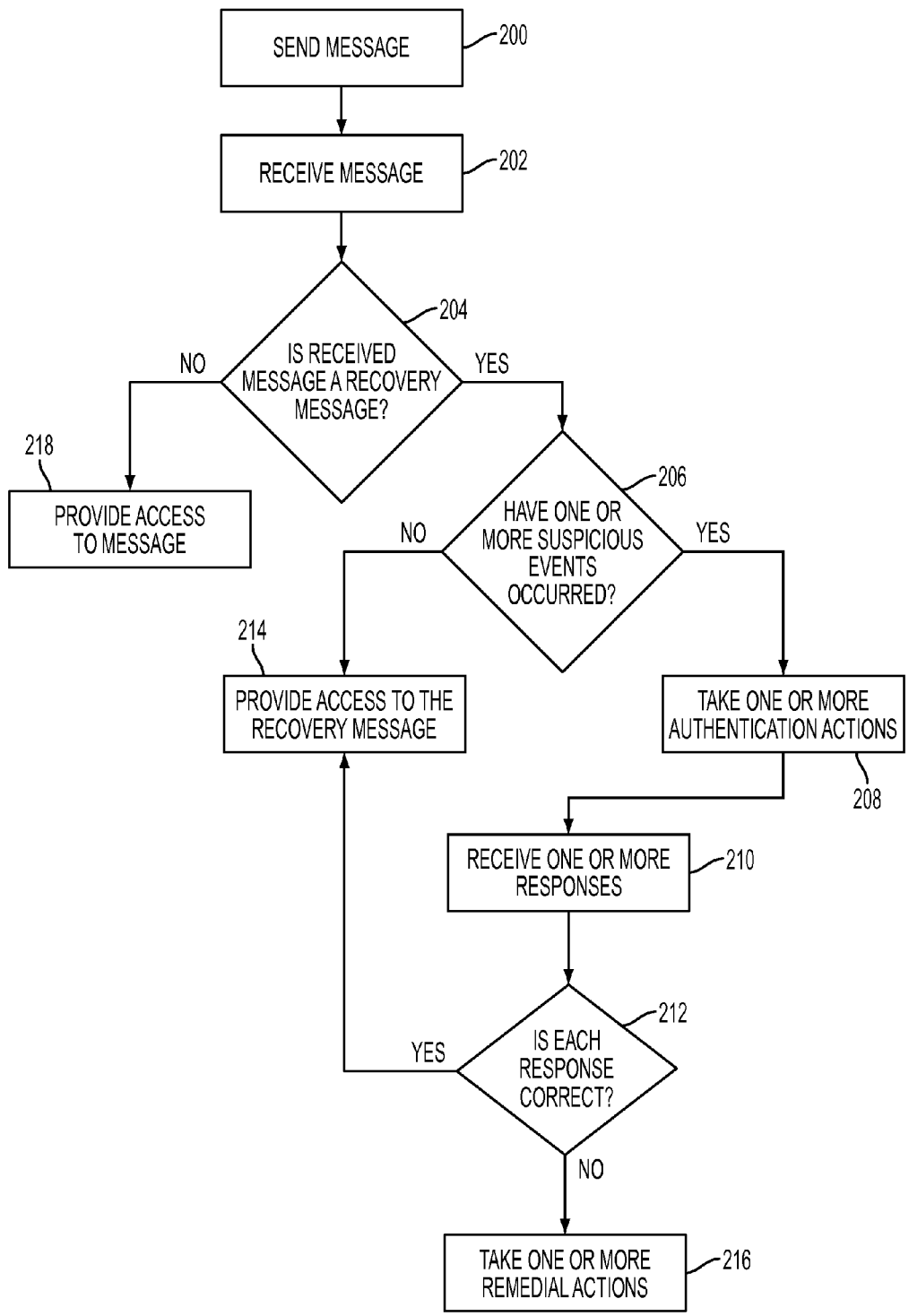
FIG. 2 illustrates a flow chart of an example method of accessing a recovery message according to an embodiment.

FIG. 2 illustrates a flow chart of an example method of accessing a recovery message according to an embodiment. As illustrated by FIG. 2, a recovery message may be sent 200 by an online service provider to an account of a messaging service provider. The recovery message may be received 202 by the messaging service provider.

In an embodiment, a messaging service provider may determine 204 whether a received message is a recovery message. For example, an email provider may analyze information associated with the sender of the message, the subject of the message and/or the content of the message to determine whether a received message is a recovery email message. For example, an email provider may search the contents of a received email message for the word "recover" or synonyms, or for information resembling access information.

In an embodiment, in response to determining that a received message is not a recovery message, a messaging service provider may provide access 218 to the message. In an embodiment, in response to determining that a received message is a recovery message, a messaging service provider may determine 206 whether one or more suspicious events have occurred over a period of time. A suspicious event may be an unusual occurrence that may be indicative of account hijacking or hacking activities. In an embodiment, a suspicious event may be one associated with the account that receives the recovery message. In another embodiment, a suspicious event may be one associated with one or more other accounts of the messaging service provider. For example, an email provider may have a global view of the activities pertaining to its accounts. An email provider may monitor access information associated with all or a portion of its accounts to recognize one or more suspicious events.

An example of a suspicious event may be the access of an account from a new or unrecognized location —i.e., a location from which the account has not previously been accessed. A messaging service provider may monitor locations from which account access requests originate. Locations may be determined based on IP addresses, network addresses, or other criteria. The locations may be stored in a data store in association with the account holder's computing device(s). If a request originates outside of a geographic area associated with one or more past access requests, the system may determine that the location is unrecognized because it is not found in the data store for any of the user's devices. Thus, the request may be identified as a suspicious event. A location may be a city, a state, a country, a geographic region and/or the like. For example, a user may have accessed the user's email account for the past six months from a location in the United States. If an access request for the user's account originates from a country other than the United States, the access request may be identified as a suspicious event.

As another example, a suspicious event may be the access of an account from an unrecognized computing device (i.e., a computing device that has not previously accessed the account). A messaging service provider may monitor computing devices from which an account access request originates. If a request originates from a computing device that has not previously accessed the account, the request may be identified as a suspicious event.

In an embodiment, a suspicious event may be the existence of multiple failed login attempts to an account before the correct access information is provided. The occurrence of multiple failed login attempts may be indicative of a hijacker or hacker trying to impermissibly access an account. In an embodiment, a suspicious event may be the access of multiple email accounts by the same computing device within a period of time.

In an embodiment, a suspicious event may be determined based on information associated with past suspicious events that have occurred. For example, an email provider may be aware of account hijacking activity that originates in a certain country. If an access request for an account originates from that country, it may be identified as a suspicious event.

In an embodiment, in response to determining that one or more suspicious events have occurred, a messaging service provider may take 208 one or more authentication actions with respect to the received recovery message. An authentication action may be an action to verify the identity of the user attempting to access the recovery message. An authentication action may involve prompting a user to provide authentication information. For example, an email provider may prompt a user to re-enter all or a portion of the access information associated with the email account. A messaging service provider may prompt a user to answer one or more security questions associated with the email account. A user may provide answers to one or more security questions when the user registers for the user's account or at another time. The messaging service provider may store the answers provided by the user, and may authenticate the answer or answers provided in response to an authentication information with the answers previously provided by the user. Example security questions may include, without limitation, "What is your mother's maiden name?", "What was your first car?", "In what city were you born?", "What was your high school mascot?" and/or the like.

In an embodiment, a messaging service provider may prompt a user to answer one or more knowledge test questions. A knowledge test question may be a question pertaining to access behavior associated with the email account to which an account holder should know the answer. Example knowledge test questions may include, without limitation, "From which city is this account most often accessed?", "When was this account last accessed?", and/or the like.

In an embodiment, a messaging service provider may receive 210 one or more responses to the one or more authentication actions, and the messaging service provider may determine 212 whether each of the one or more responses is correct. If each received response is correct, the messaging service provider may grant 214 access to the recovery message to the user. If one or more received responses is incorrect, the messaging service provider may take 216 one or more remedial actions. In an embodiment, a messaging service provider may not grant the user access to the recovery message. The messaging service provider may also temporarily restrict access to and/or disable the associated email account. For example, the messaging service provider may prevent access to the account for twenty-four hours. Additional and/or alternate time periods may be used within the scope of this disclosure.

In an embodiment, a messaging service provider may send a notification to an account holder. The messaging service provider may send the account holder a notification via email, such as, for example, to a secondary email address that the account holder provided. In an embodiment, a messaging service provider may send a notification to an account holder via text message and/or the like. The notification may indicate that certain suspicious activity has been detected with respect to the holder's account, and that certain remedial actions are being taken.

Figure 3:
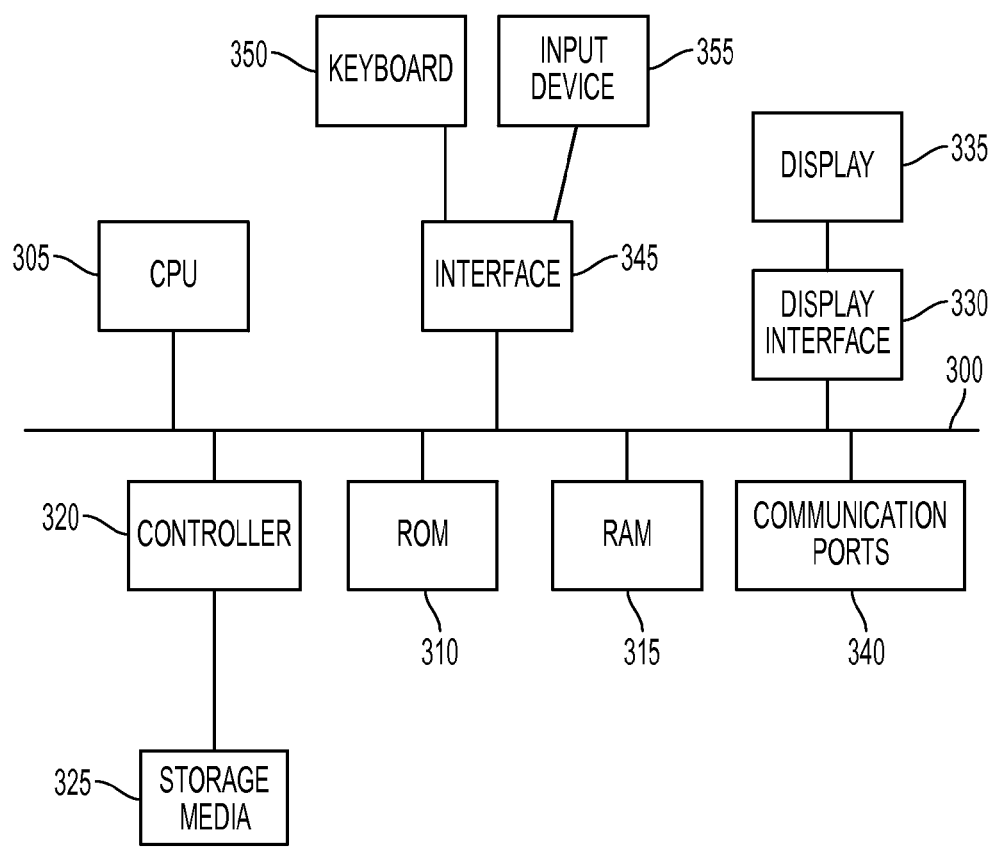
FIG. 3 illustrates a block diagram of example hardware that may be used to contain or implement program instructions according to an embodiment.

FIG. 3 depicts a block diagram of hardware that may be used to contain or implement program instructions. A bus 300 serves as the main information highway interconnecting the other illustrated components of the hardware. CPU 305 is the central processing unit of the system, performing calculations and logic operations required to execute a program. CPU 305, alone or in conjunction with one or more of the other elements disclosed in FIG. 3, is an example of a production device, computing device or processor as such terms are used within this disclosure. Read only memory (ROM) 310 and random access memory (RAM) 315 constitute examples of non-transitory computer-readable storage media.

A controller 320 interfaces with one or more optional non-transitory computer-readable storage media 325 to the system bus 300. These storage media 325 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 310 and/or the RAM 315. Optionally, the program instructions may be stored on a tangible non-transitory computer-readable medium such as a compact disk, a digital disk, flash memory, a memory card, a USB drive, an optical disc storage medium, such as a Blu-ray™ disc, and/or other recording medium.

An optional display interface 330 may permit information from the bus 300 to be displayed on the display 335 in audio, visual, graphic or alphanumeric format. Communication with external devices, such as a printing device, may occur using various communication ports 340. A communication port 340 may be attached to a communications network, such as the Internet or an intranet.

The hardware may also include an interface 345 which allows for receipt of data from input devices such as a keyboard 350 or other input device 355 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method comprising:
    receiving, by a computing device, a recovery message directed to a first account associated with a messaging service provider and a user, wherein the recovery message comprises access information associated with a second account of an online service provider, wherein the second account is associated with the user;
    in response to receiving a recovery message, determining whether one or more suspicious events involving the first account have occurred;
    in response to determining that one or more suspicious events have occurred, prompting the user to provide authentication information in order to access the recovery message;
    receiving one or more responses from the user;
    verifying the one or more responses; and
    in response to determining that each of the responses is correct, granting access, by the computing device, to the recovery message.

2. The method of claim 1, wherein determining whether one or more suspicious events involving the first account have occurred comprises determining whether the first account has been accessed from an unrecognized location.

3. The method of claim 1, wherein determining whether one or more suspicious events involving the first account have occurred comprises determining whether the first account has been accessed from an unrecognized computing device.

4. The method of claim 1, wherein determining whether one or more suspicious events involving the first account have occurred comprises determining whether one or more failed logins associated with the first account have occurred.

5. The method of claim 1, wherein determining whether one or more suspicious events involving the first account have occurred comprises determining whether a computing device used to access the first account has accessed one or more other accounts of the messaging service provider within a time period.

6. The method of claim 1, wherein prompting a user to provide authentication information in order to access the recovery message comprises prompting a user to answer one or more security questions associated with the first account.

7. The method of claim 1, wherein prompting a user to provide authentication information in order to access the recovery message comprises prompting a user to answer one or more knowledge test questions associated with the first account.

8. A method comprising:
    receiving, by a computing device, a recovery message directed to a first account associated with a messaging service provider and a user, wherein the recovery message comprises access information associated with a second account of an online service provider, wherein the second account is associated with the user;
    in response to receiving a recovery message, determining whether one or more suspicious events involving the first account have occurred;
    in response to determining that one or more suspicious events have occurred, prompting the user to provide authentication information in order to access the recovery message;
    receiving one or more responses from the user;
    verifying the one or more responses; and
    in response to determining that one or more of the responses is incorrect, performing one or more remedial actions.

9. The method of claim 8, wherein determining whether one or more suspicious events involving the first account have occurred comprises determining whether the first account has been accessed from an unrecognized location.

10. The method of claim 8, wherein determining whether one or more suspicious events involving the first account have occurred comprises determining whether the first account has been accessed from an unrecognized computing device.

11. The method of claim 8, wherein determining whether one or more suspicious events involving the first account have occurred comprises determining whether one or more failed login associated with the first account have occurred.

12. The method of claim 8, wherein determining whether one or more suspicious events involving the first account have occurred comprises determining whether a computing device used to access the first account has accessed one or more other accounts of the messaging service provider within a time period.

13. The method of claim 8, wherein prompting a user to provide authentication information in order to access the recovery message comprises prompting a user to answer one or more security questions associated with the first account.

14. The method of claim 8, wherein prompting a user to provide authentication information in order to access the recovery message comprises prompting a user to answer one or more knowledge test questions associated with the first account.

15. The method of claim 8, wherein performing one or more remedial actions comprises restricting access to the recovery message.

16. The method of claim 8, wherein performing one or more remedial actions comprises temporarily restricting access to the first account.

17. The method of claim 8, wherein performing one or more remedial actions comprises notifying the user that suspicious account activity has occurred.

18. A system comprising:
    a computing device; and
    a computer-readable storage medium in communication with the computing device, wherein the computer-readable storage medium comprises one or more programming instructions that, when executed, cause the computing device to:
        receive a recovery message directed to a first account associated with a messaging service provider and a user, wherein the recovery message comprises access information associated with a first account of an online service provider, wherein the second account is associated with the user,
        in response to receiving a recovery message, determine whether one or more suspicious events involving the first account have occurred, in response to determining that one or more suspicious events have occurred, prompt a user to provide authentication information in order to access the recovery message,
receive one or more responses from a user,
verify the one or more responses, and
in response to determining that each of the responses is correct, granting access to the recovery message.

19. The system of claim 18, wherein the one or more programming instructions that, when executed, cause the computing device to determine whether one or more suspicious events involving the first account have occurred comprise one or more programming instructions that, when executed, cause the computing device to perform one or more of the following:
   determine whether the first account has been accessed from an unrecognized location;
   determine whether the first account has been accessed from an unrecognized computing device;
   determine whether one or more failed login associated with the first account have occurred; and
   determine whether a computing device used to access the first account has accessed one or more other accounts of the messaging service provider within a time period.

20. The system of claim 18, wherein the one or more programming instructions that, when executed, cause the computing device to prompt a user to provide authentication information comprise one or more programming instructions that, when executed, cause the computing device to perform one or more of the following:
   prompt a user to answer one or more security questions associated with the first account; and
   prompt a user to answer one or more knowledge test questions associated with the first account.

21. A system, comprising:
a computing device; and
a computer-readable storage medium in communication with the computing device, wherein the computer-readable storage medium comprises one or more programming instructions that, when executed, cause the computing device to:
   receive a recovery message directed to a first account associated with a messaging service provider and a user, wherein the recovery message comprises access information associated with an account of an online service provider, wherein the second account is associated with the user,
   in response to receiving a recovery message, determine whether one or more suspicious events involving the first account have occurred,
   in response to determining that one or more suspicious events have occurred, prompt a user to provide authentication information in order to access the recovery message,
   receive one or more responses from a user,
   verify the one or more responses, and
   in response to determining that one or more of the responses is incorrect, perform one or more remedial actions.

22. The system of claim 21, wherein the one or more programming instructions that, when executed, cause the computing device to determine whether one or more suspicious events involving the email account have occurred comprise one or more programming instructions that, when executed, cause the computing device to perform one or more of the following:
   determine whether the first account has been accessed from an unrecognized location;
   determine whether the first account has been accessed from an unrecognized computing device;
   determine whether one or more failed login associated with the first account have occurred; and
   determine whether a computing device used to access the first account has accessed one or more other accounts of the messaging service provider within a time period.

23. The system of claim 21, wherein the one or more programming instructions that, when executed, cause the computing device to prompt a user to provide authentication information comprise one or more programming instructions that, when executed, cause the computing device to perform one or more of the following:
   prompt a user to answer one or more security questions associated with the first account; and
   prompt a user to answer one or more knowledge test questions associated with the first account.

24. The system of claim 21, wherein the one or more programming instructions that, when executed, cause the computing device to perform one or more remedial actions comprise one or more programming instructions that, when executed, cause the computing device to perform one or more of the following:
   restrict access to the recovery message;
   temporarily restrict access to the first account; and
   notify the user that suspicious account activity has occurred.

* * * * *